Aug. 16, 1932.   V. BENDIX   1,871,441
BRAKE MECHANISM
Filed Jan. 8, 1927   3 Sheets-Sheet 1
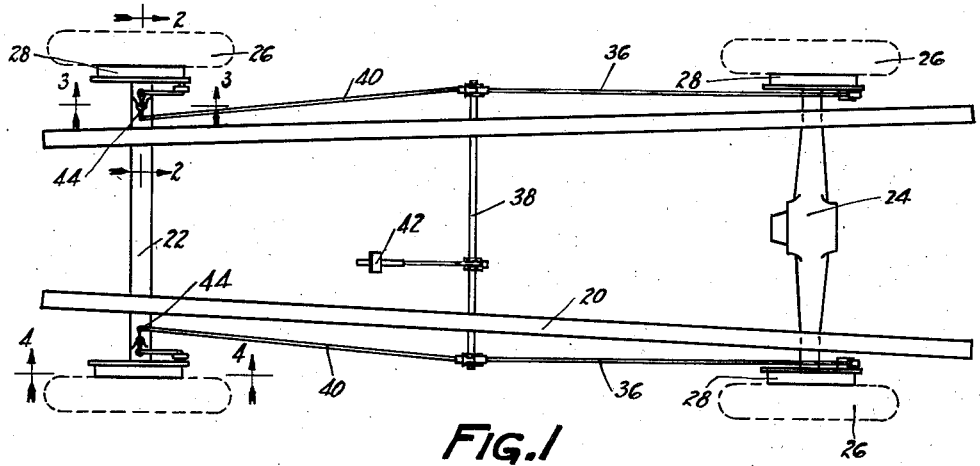
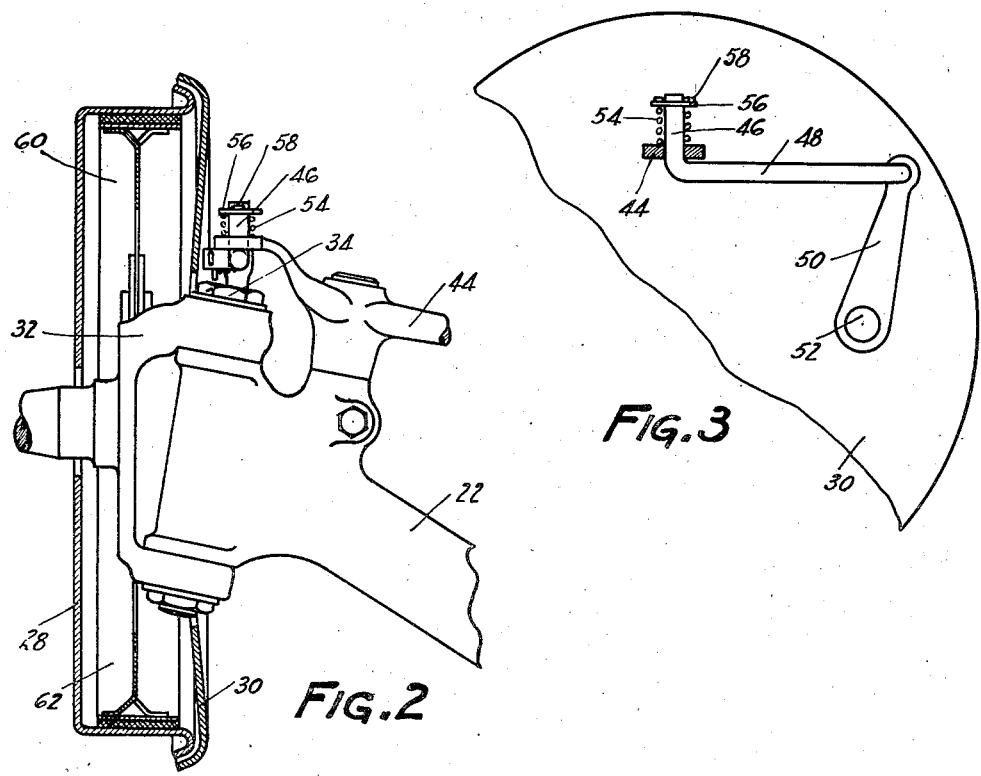
INVENTOR
VINCENT BENDIX
BY
*Jn. W. McConkey*
ATTORNEY Aug. 16, 1932.     V. BENDIX     1,871,441
BRAKE MECHANISM
Filed Jan. 8, 1927     3 Sheets-Sheet 2

INVENTOR
VINCENT BENDIX
BY
*Jn. W. McConkey*
ATTORNEY

Aug. 16, 1932.  V. BENDIX  1,871,441

BRAKE MECHANISM

Filed Jan. 8, 1927  3 Sheets-Sheet 3

INVENTOR
VINCENT BENDIX
BY
ATTORNEY

Patented Aug. 16, 1932

1,871,441

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKE MECHANISM

Application filed January 8, 1927. Serial No. 159,806.

This invention relates to brakes, and is illustrated as embodied in an internal expanding automobile brake of the type in which the friction device anchors at one end when the drum is turning in one direction and at the other end when the drum is turning in the other direction.

An important object of the invention is to provide a novel brake-applying device which can float freely, to center itself and also to permit the anchoring of the friction device at either end when used with the illustrated type of brake, and yet which is operated by a shaft or equivalent means which is definitely fixed in its position, as by being journalled in fixed bearings. In one desirable arrangement, the cam or other applying device has a lever, shown extending toward the center of the brake drum and pivoted at its end to the end of an arm on the end of the shaft. Various features of novelty relate to the arrangement of the arm and lever with respect to each other and to the shaft, especially in the use of stampings to form the cam and other parts.

Another important object of the invention is to provide improved anchoring means for a brake of this type, by utilizing one or a pair of plates or other supports on opposite sides of the ends of the friction device and formed for anchoring engagement with said ends. The applying means may, if desired, be arranged between the plates. This form of anchoring means is especially useful when the applying means acts on rollers on the ends of the friction device, the pivot members of the rollers being laterally extended for anchoring engagement with the spaced plates or equivalent parts.

The above and other objects and features of the invention, including various novel combinations of parts and desirable particular constructions, will be apparent from the following description of one illustrative embodiment shown in the accompanying drawings, in which:

Figure 1 is a diagrammatic top plan view of an automobile chassis having brakes on all four wheels;

Figure 2 is a transverse vertical section through the right front brake, on the line 2—2 of Figure 1, looking toward the rear of the car;

Figure 3 is a partial section on the line 3—3 of Figure 1, showing part of the operating mechanism;

Figure 4:
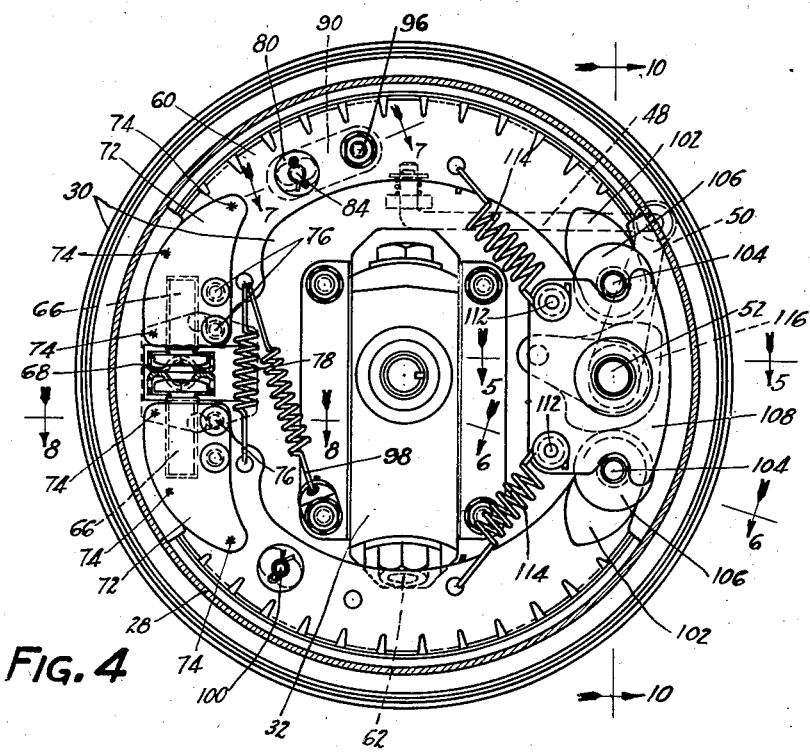
Figure 4 is a vertical section through one of the brakes, on the line 4—4 of Figure 1, showing the friction means in side elevation.
Figure 5:
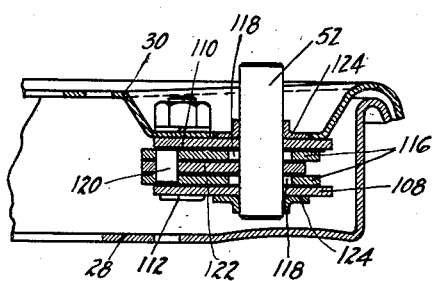
Figure 5 is a partial section on the line 5—5 of Figure 4, showing the applying means.
Figure 6:
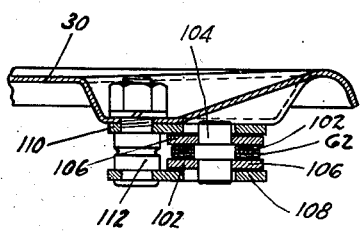
Figure 6 is a partial section on the line 6—6 of Figure 4, showing the anchorage of one of the ends.
Figure 7:
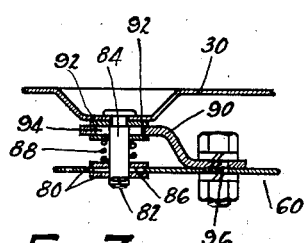
Figure 7 is a partial section on the line 7—7 of Figure 4, showing a positioning device for one of the shoes.
Figure 8:
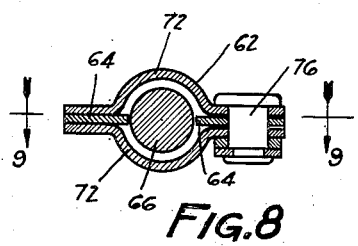
Figure 8 is a section through one of the shoes, on the line 8—8 of Figure 4.

The chassis shown in Figure 1 includes a frame 20, supported through the usual springs on front and rear axles 22 and 24 having road wheels 26, provided with brake drums 28. A support such as a backing plate 30 is arranged at the open side of each drum, the backing plates for the front brakes being bolted to the knuckles 32 on which the wheels are rotatably mounted, and which are swivelled by king pins 34 or the like to the ends of axle 22.

Each of the rear brakes is operated by a link 36 connected to an arm on the end of a cross-shaft 38 while the front brakes are also operated by links 40 from arms on shaft 38.

The shaft is rocked by means such as a pedal 42 to apply all four brakes.

Each of the front brakes is operated by a generally-horizontal lever 44 fulcrumed on the axle 22 near its end, and having at its end a vertical opening for the vertically-turned end 46 of a link 48 having its rear end turned horizontally and passed through an opening in the upper end of a lever 50 fixed on a brake-applying shaft 52 at the rear side of the brake. Each end of link 48 is held against rattling by a spring 54 confined by a washer 56 held by a cotter pin 58. When the brake is applied, the axis of part 46 is arranged in or immediately adjacent the swivelling axis of the wheel—i. e. the axis of the king pin 34.

The friction means of the illustrated brake is the form of a floating device built up of two rigid and interchangeable arcuate shoes 60 and 62. Each shoe has a central stiffening web slotted to form tongues welded or otherwise secured to an outer band carrying the brake lining. At the end of each shoe opposite the applying means, the web is cut or stamped out to form teeth 64 meshing with opposite sides of a worm formed on the stem of an adjusting member 66.

Figure 9:
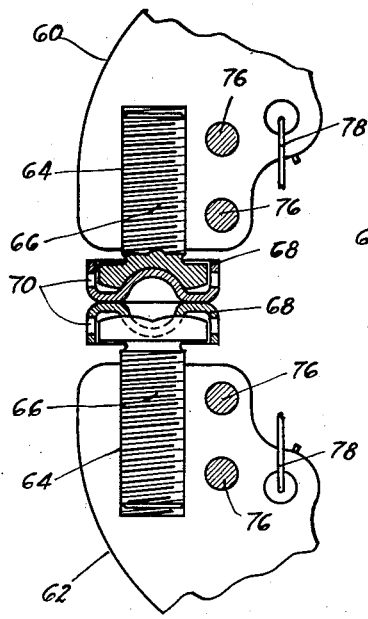
Figure 9 is a partial elevation of the connected ends of the shoes forming the friction device, with the outer plates removed, and being in effect a section on the line 9—9 of Figure 8.
Figure 10:
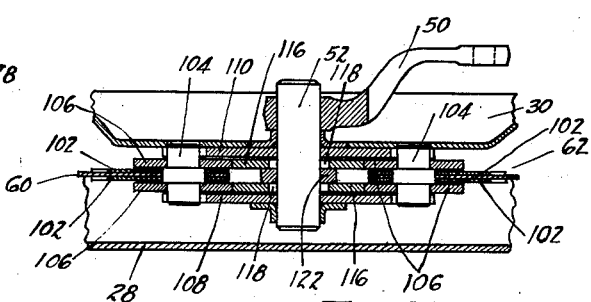
Figure 10 is a partial section on the line 10—10 of Figure 4, through the applying and anchoring means.

Member 66 has an enlarged head formed with a semispherical socket for a thrust ball formed in the centers of two duplicate stampings 68 which are welded together to form an adjusting member (see Figure 9). The edges of stampings 68 are formed as polygonal flanges serving, in effect, as socket wrenches to embrace the heads of members 66, so that a tool may be inserted in openings 70 to turn member 68 to adjust both of the members 66 in or out of their shoes to take up for wear of the brake lining.

Patches or stampings 72 are spot-welded at 74 to opposite sides of the web of each shoe, and are formed to embrace the stems of the adjusting members 66. At the side opposite the spot welds 74 there are a pair of fastenings 76 serving to hold the stampings 72 clamped, under fixed tension, against the opposite sides of member 66, thus holding it frictionally against unintended movement. A spring 78 holds members 66 in engagement with member 68, thus forming a floating pivotal connection between the shoes.

The above-described connection is not claimed in the present application, as it forms the subject-matter of my divisional application Serial No. 521,112 filed March 9, 1931.

A pair of washers 80 engaging opposite sides of the web of shoe 60 are held by a cotter pin 82 on the end of a pin 84 having its end riveted over to secure it permanently to the backing plate, and passing through a relatively large opening 86, a spring 88 being sleeved on the pin 84, this forming a yielding steady rest for the shoe.

A positioning device 90 is provided with a slot 94 for pin 84, slightly under the pin 84 but much longer, and engaged by washers 92. At its opposite end, the positioning device is frictionally clamped to the shoe, to resist angular movement with respect to the shoe, by a bolt 96 carried by the shoe.

When the brake is applied, the drum 28 being assumed to be turning counter-clockwise in Figure 4 (i. e. the vehicle being assumed to be moving forward), member 90 moves outward toward the drum with its shoe, this movement normally being permitted by the fact that opening 94 is slightly wider than pin 84. If, however, the brake lining has worn unduly, member 90 is shifted slightly during the application of the brake, against the resistance of bolt 96, to take up a new position such that the shoe will have its desired predetermined clearance with respect to the drum when the brake is again released. A return spring 98 urges shoe 60 toward this released position.

Shoe 62 is provided with a steady rest 100, like the one described above except that there is no positioning device 90 and no bolt 96.

At their unconnected ends shoes 60 and 62 (reinforced if desired by plates or patches 102) are provided with pivot members 104 having enlarged central portions received in the shoe webs (including plates 102 if provided), and having reduced-diameter ends for thrust rollers 106, which thus have a secondary function of engaging the enlarged central portion of each member 104 to prevent it from moving axially.

Each member 104 projects beyond its rollers 106, to serve as an anchoring device adapted to seat in notches formed in the edges of spaced supports or plates 108 and 110, which are spaced apart, and also which are secured to the backing plate 30, by posts or bolts 112. These bolts are arranged inside the curve of the shoe, where they are out of the way, and the plates 108 and 110 overhang the posts, with ends of the shoes received between them. Posts 112 are also utilized in this particular design for the attachment of the main return springs 114 of the shoes 60 and 62.

In the arrangement of Figures 4–10, the brake is applied by a pair of stampings 116, formed with large clearance openings 118 for shaft 52, and having a suitably-shaped edge or cam contour for direct operative engagement with rollers 106. Cams or stampings 116 are extended toward the center of the drum to form integral levers connected at their inner ends, by a pivot 120 held against axial movement by plates 108 and 110, to the inner end of a stamping 122 forming a brake-applying arm fixedly secured to shaft 52 between the two cams 116.

Shaft 52 is shown journalled in bearings provided by stampings 124 welded to plates 108 and 110. It will be seen that cams 116 form floating expanding means supported wholly by arm 122 and by the ends of shoes 60 and 62 (i. e. by rollers 106).

Figure 11:
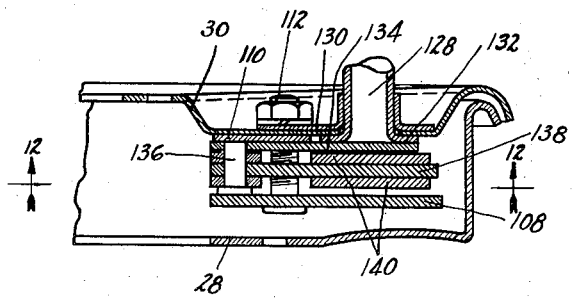
Figure 11 is a view corresponding to Figure 5, but showing a modification of the applying means.
Figure 12:
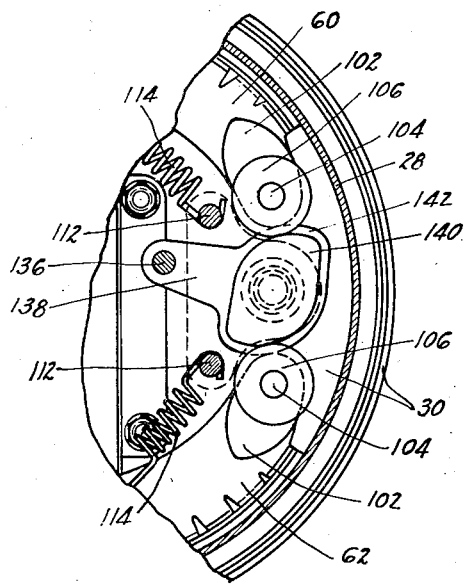
Figure 12 is a partial section on the line 12—12 of Figure 11, showing the modified applying means in elevation.

In the arrangement of Figures 11 and 12, shaft 52 is replaced by a hollow shaft 128, journalled in a bearing 130 secured against the outside of the backing plate 30 by the posts or bolts 112, and flared at its end to form a flange 132, to which there is welded or otherwise secured a stamping or arm 134 corresponding to arm 122.

To the end of arm 134 there is connected, by means such as a pivot 136, a floating lever 138. To the opposite sides of lever 138 there are welded or otherwise secured two stamped cams 140 engaging the rollers 106. As best appears in Figure 12, that part of lever 138 between the two cams 140 is preferably enlarged to project beyond the edges of the cams to form a rib 142 projecting between the pairs of rollers 106. Thus parts 138 and 140 in effect form a single rigid laminated cam with a central rib to project between the rollers.

In Figure 4 the brake is shown applied, but with the drum stationary, so that neither of the pivot members 104 is seated in its anchoring notches in the edges of plates 108 and 110. If the drum were turning clockwise (vehicle moving backward), the upper pivot member 104 would seat in its anchoring notches, whereas if the drum were turning counter-clockwise (vehicle moving forward) the lower member 104 would seat in its anchoring notches.

While certain illustrative constructions have been described in detail, it is not my intention to limit the scope of the invention to those particular constructions, or otherwise than by the terms of the appended claims.

I claim:

1. A brake comprising, in combination, retarding means, a shaft having an arm angularly movable therewith, and a floating applying device for the retarding means including a floating lever having members straddling the arm, the lever being pivotally connected at its end to the end of said arm and means adjacent the applying device for restraining lateral movement of the retarding means.

2. A brake comprising, in combination, retarding means, a shaft having an arm angularly movable therewith, and a floating applying device for the retarding means including a floating lever formed of a pair of spaced plates pivotally connected at its end to the end of said arm, the applying device being supported wholly by the retarding means and said arm.

3. A brake comprising, in combination, retarding means, a shaft having an arm angularly movable therewith, and a floating applying device for the retarding means including a floating lever formed of a pair of spaced plates pivotally connected to said arm.

4. A brake comprising, in combination a support retarding means, a shaft having an arm angularly movable therewith journaled in said support on opposite sides of said arm, and a floating applying device for the retarding means including a floating lever beside and paralleling said arm, the corresponding ends of the arm and lever being operatively connected.

5. Brake-applying means comprising, in combination a support, a shaft journalled on said support and having an arm projecting therefrom, a lever connected at one end to the arm and extending beside the arm in the direction of the shaft, said lever comprising two parts one part on each side of the arm and applying means on the lever.

6. Brake-applying means comprising, in combination, a shaft having an arm, a lever formed of spaced stamped members connected at its end to the end of said arm, and applying means carried by the lever.

7. Brake-applying means comprising, in combination, a shaft having an arm, a lever formed of spaced plates arranged on opposite sides of said arm and connected at its end to the end of said arm, and a cam at the end of said lever.

8. Brake-applying means comprising, in combination, a shaft journalled adjacent one end and having an arm projecting therefrom, a two part lever connected at one end to said arm one part on each side of said arm and extending beside the arm in the direction of the shaft, and a cam on each part of the lever substantially opposite the end of the shaft.

9. A brake comprising, in combination, a drum, friction means engageable with the drum and having adjacent relatively-movable parts anchoring means for the friction means, a shaft journaled in the anchoring means terminating in the space between said parts and having an arm at its end extending toward the center of the drum, and a floating applying device engaging said parts and including a lever pivoted to the end of said arm.

10. A brake comprising, in combination, a drum, friction means engageable with the drum and having adjacent relatively-movable parts, an arm fulcrumed between said parts and extending toward the center of the drum, and a floating applying device engaging said parts and including a lever formed of spaced plates pivoted to the end of said arm with the plates on opposite sides thereof.

11. Brake-operating means comprising, in combination, a support, a pair of posts secured to the support, a plate mounted on said posts and spaced from said support, a shaft rotatably supported by said plate and said support and having an arm projecting between said posts, and a floating brake-applying device between the support and plate and operatively connected to said arm.

12. Brake-operating means comprising, in combination, a support, a pair of posts secured to the support, a plate mounted on said posts and spaced from said support, a shaft having an arm projecting between said posts, and a floating brake-applying device between the support and plate and operatively connected to said arm.

13. Brake-operating means comprising, in combination, a support, a pair of posts secured to the support, a plate mounted on said posts and spaced from said support, a shaft rotatably supported by said plate and said support and having an arm projecting between said posts, and a floating brake-applying device between the support and plate and operatively connected to said arm, the brake-applying device having a relatively large opening for said shaft so that its operative movement is not restricted by the shaft.

14. Brake-operating means comprising, in combination, a support, a pair of posts secured to the support, a plate mounted on said posts and spaced from said support, a shaft rotatably supported by said plate and said support and having an arm projecting between said posts, and a floating brake-applying device between the support and plate and operatively connected to said arm, the brake-applying device including parts on both sides of said arm having relatively large openings for said shaft so that their operative movement is not restricted by the shaft.

15. Brake-applying means comprising, in combination, a shaft having a flange at its end, an arm secured to said flange, and an applying device opposite the end of the shaft including a lever connected to the arm.

16. Brake-applying means comprising, in combination, a hollow shaft flared outwardly at its end to form a flange, and an applying device including a part secured to said flange.

17. A brake-applying device comprising, in combination, a plurality of flat stampings secured together to form a rigid laminated member, certain ones of said stampings being formed with cam contours at their edges, and at least one being extended to form an operating arm.

18. A brake comprising, in combination, friction means having spaced rollers, a plurality of flat stampings secured together to form a rigid laminated member, certain spaced ones of said stampings being formed with cam contours at their edges to engage said rollers, and at least one of said stampings being between said spaced stampings and projecting outwardly beyond them to form a rib extending between said rollers.

19. A brake comprising, in combination, a drum, a floating retarding device anchoring at one end when the drum is turning in one direction and at the other end when the drum is turning in the other direction, parts projecting laterally from the ends of said device, rollers carried by said parts, applying means between said ends engaging said rollers, and stationary means engaged by one or the other of said parts to take the torque of said device.

20. A brake comprising, in combination, a drum, a floating retarding device anchoring at one end when the drum is turning in one direction and at the other end when the drum is turning in the other direction, parts projecting laterally from the ends of said device, pairs of rollers carried by said parts and arranged on opposite sides of said device, an applying device between said ends engaging said rollers and formed with a rib extending between the rollers on opposite sides, and stationary means engaged by one or the other of said parts to take the torque of said device.

21. A brake comprising, in combination, a drum, a floating device anchoring at either end according to the direction of drum rotation, a pair of spaced supports between which said ends project and at least one of which is arranged to serve as an anchoring abutment for said ends, and applying means between said spaced supports and operatively engaging said ends.

22. A brake comprising, in combination, a drum, a floating device anchoring at either end according to the direction of drum rotation, pivot members on said ends, a pair of spaced supports between which said ends project and at least one of which is formed to serve as an anchoring abuttment embracing and engaging said pivot members, rollers on said members between the supports, and applying means between said spaced supports and operatively engaging said rollers.

23. A brake comprising, in combination, a friction device having a pivot member projecting laterally from its sides near its end, rollers on said member on opposite sides of the friction device, stationary parts on opposite sides of the friction device notched to receive and position the ends of said pivot member, and an applying device engaging the rollers.

24. A brake comprising, in combination, a friction device having a pivot member near its end, a roller on said member, a stationary part notched to receive and position said pivot member, and an applying device engaging the roller.

25. A brake comprising, in combination, a drum, a floating friction device within the drum, rollers on opposite sides of each end of the friction device having a pivot member projecting beyond the rollers, spaced stationary members on opposite sides of said ends and notched to receive the ends of the two pivot members, and applying means between said members including a cam engaging the rollers.

26. A brake comprising, in combination, a drum, a floating friction device having spaced separable ends and arranged within the drum, spaced stationary members on opposite sides of said ends and formed to engage the ends, and applying means between said members including a cam engaging said ends.

27. A brake comprising, in combination, a drum, a floating friction device having spaced separable ends and arranged within the drum, spaced stationary members on opposite sides of said ends and formed to engage the ends, and applying means between said members including a floating lever having an operating device pivoted to its end and having a cam engaging said ends, and which is supported by the operating device and by said ends.

28. A brake comprising, in combination, a drum, a floating friction device anchoring at either end according to the direction of drum rotation, a shaft adjacent the space between said ends having an arm extending toward the center of the drum, and a floating expanding device engaging and in part supported by said ends and having an operating lever comprising spaced side members extending toward the center of the drum and pivoted to the end of said arm and said arm arranged intermediate the side members.

29. A brake comprising, in combination, a friction member having rollers on its opposite sides, a pivot member having an enlarged central portion received in the friction member and having reduced ends projecting through and beyond the rollers, and parts on opposite sides of the rollers and preventing axial movement of the rollers and through the action of the rollers on the enlarged central portion also serving to prevent axial movement of the pivot member, and which are formed with openings for the ends of the pivot member.

30. A brake comprising, in combination, a friction member having rollers on its opposite sides, a pivot member having an enlarged central portion received in the friction member and having reduced ends projecting through the rollers, and parts on opposite sides of the rollers and preventing axial movement of the rollers and through the action of the rollers on the enlarged central portion also serving to prevent axial movement of the pivot member.

31. A brake comprising, in combination, a friction device having adjacent ends on either of which it is adapted to anchor, parts projecting laterally from said ends, spaced plates on opposite sides of said ends and formed for engagement by said parts, and posts substantially inside the friction device and securing the plates in place and spacing them apart, the plates overhanging the posts, and the braking torque being transmitted from the friction device through the projecting parts to the plates and thence to the posts.

In testimony whereof, I have hereunto signed my name.

VINCENT BENDIX.